(12) United States Patent
Rikhy et al.

(10) Patent No.: US 7,231,034 B1
(45) Date of Patent: Jun. 12, 2007

(54) "PULL" ARCHITECTURE CONTACT CENTER

(75) Inventors: Sudeep Rikhy, Fremont, CA (US); Paul Rudnick, Danville, CA (US)

(73) Assignee: Acqueon Technologies, Inc., Princeton, NJ (US)

( * ) Notice: Subject to any disclaimer, the term of this patent is extended or adjusted under 35 U.S.C. 154(b) by 633 days.

(21) Appl. No.: 10/691,118

(22) Filed: Oct. 21, 2003
(Under 37 CFR 1.47)

(51) Int. Cl.
*H04M 3/00* (2006.01)
*H04M 5/00* (2006.01)

(52) U.S. Cl. .............. 379/265.09; 379/265.11

(58) Field of Classification Search ..............
379/265.02–266.1, 309; 370/270, 352, 354; 709/201, 202
See application file for complete search history.

(56) References Cited

U.S. PATENT DOCUMENTS 6,985,576 B1 * 1/2006 Huck .................... 379/265.09
2001/0040887 A1 * 11/2001 Shtivelman et al. ........ 370/352
2002/0141561 A1 * 10/2002 Duncan et al. ......... 379/220.01
2004/0047302 A1 * 3/2004 Dezonno et al. ........... 370/270
2005/0086290 A1 * 4/2005 Joyce et al. ................ 709/202
2006/0165066 A1 * 7/2006 Campbell et al. .......... 370/352

* cited by examiner

*Primary Examiner*—Benny Quoc Tieu
(74) *Attorney, Agent, or Firm*—Townsend and Townsend and Crew LLP (57) ABSTRACT

A system and method for processing a user inquiry. The method includes receiving a user inquiry, sending a first request for user information to a first database, providing the user information from the first database, and selecting a first agent. The first agent has a desirable set of skills and is available. Additionally, the method includes sending the user information to the selected first agent with a first web browser and sending the user inquiry to the selected first agent in response to a first signal indicative of a first consent from the selected first agent within a predetermined period of time.

31 Claims, 9 Drawing Sheets

"PULL" ARCHITECTURE CONTACT CENTER

BACKGROUND OF THE INVENTION

The present invention relates generally to the field of inquiry distribution and processing. More particularly, the invention provides a method and system for distributing inquiries to appropriate agents. Merely by way of example, the method and system have been applied to a contact center. It would be recognized that the invention can be applied to other circumstances that need inquiry processing.

Conventional contact centers or call centers provide customers with access to various services and related information. For example, the services include retrieving bank account balances and credit card payments, and providing technical support. Typically, the customers begin their contacts with the call centers by dialing specific telephone numbers that are answered by computers of corresponding call centers. The computers typically prompt the customers for additional information, such as credit card numbers, technical support numbers or social security numbers. Subsequently, the computers offer the customers various options to proceed. For example, the customers may press "1" for payments, "2" for balances, and "0" for other inquiries. For other inquiries, the calls are typically transferred to agents who should be provided the information that the customers already provided to the computers.

The above description provides an example of a "push" implementation where the customer data and the telephone calls are pushed to the agents. Unfortunately, "pushing" the customer data with the telephone calls is a complex process. The complexity increases as the number of agents increases, and the difficulty is further compounded by geographical separation of agents or groups of agents. For example, if the agents are not ready or if their computers are not ready to receive the "pushed" information, the customer information is usually lost and needs to be re-entered by agents. Furthermore, the telephone calls may be disconnected. In addition, tracking availability of the agents and their skill sets is highly complex and dynamic.

Hence it is desirable to improve techniques of inquiry distribution and processing.

BRIEF SUMMARY OF THE INVENTION

The present invention relates generally to the field of inquiry distribution and processing. More particularly, the invention provides a method and system for distributing inquiries to appropriate agents. Merely by way of example, the method and system have been applied to a contact center. It would be recognized that the invention can be applied to other circumstances that need inquiry processing.

According to one embodiment, a method for processing a user inquiry includes receiving a user inquiry, sending a first request for user information to a first database, providing the user information from the first database, and selecting a first agent. The first agent has a desirable set of skills and is available. Additionally, the method includes sending the user information to the selected first agent with a first web browser and sending the user inquiry to the selected first agent in response to a first signal indicative of a first consent from the selected first agent within a predetermined period of time.

According to another embodiment, a method for processing a user inquiry includes receiving user information from a first database. The user information is associated with a request. Additionally, the method includes processing the user information with a web browser, sending a first signal indicative of a first consent within a predetermined period of time in response to the user information, and receiving a user inquiry in response to the first signal indicative of the first consent.

According to yet another embodiment, a system for processing a user inquiry includes a user interface system to receive a user inquiry and to request user information associated with the user inquiry, and a first database to store and provide information associated with at least the user inquiry. Additionally, the system includes a second database to store information relating to a plurality of agents. The information relates to the plurality of agents and includes a plurality of sets of skills corresponding to the plurality of agents respectively. Moreover, the system includes an agent allocation system to identify a first agent having a desirable set of skills and being available based on at least the information relating to the plurality of agents. Also, the system includes an agent interface system for the first agent configured to receive the user information with a web browser and send a first signal indicative of a first consent from the first agent in response to at least the user information.

A further understanding of the nature and advantages of the present invention may be realized by reference to the remaining portions of the specification and the drawings.

DETAILED DESCRIPTION OF THE INVENTION

The present invention relates generally to the field of inquiry distribution and processing. More particularly, the invention provides a method and system for distributing inquiries to appropriate agents. Merely by way of example, the method and system have been applied to a contact center. It would be recognized that the invention can be applied to other circumstances that need inquiry processing.

The following description refers to a number of system diagrams and processes. These diagrams are merely illustrations, which should not unduly limit the scope of the claims. One of ordinary skill in the art would recognize many variations, alternatives, and modifications. Although the embodiments will be described using a selected group of systems, there can be many alternatives, modifications, and variations. For example, some of the systems may be expanded and/or combined. Other systems may be inserted to those specifically noted. Depending upon the embodiment, the specific systems may be interchanged with others replaced. Further details of these elements are found throughout the present specification.

Similarly, although some embodiments will be described using a selected sequence of processes, there can be many alternatives, modifications, and variations. For example, some of the processes may be expanded and/or combined. Other processes may be inserted to those specifically noted. Depending upon the embodiment, the specific sequence of steps may be interchanged with others replaced. Further details of these processes and steps are found throughout the present specification.

Additionally, elements in system block diagrams represent a particular functional division, and do not necessarily imply that the elements are separate hardware elements. For example, while servers, engines, databases, and the like are treated as functionally separate elements, one or more may be implemented as software processes running on the same hardware, or may be combinations of hardware and software. Thus the subdivisions in the diagrams are intended for illustration.

Overview

Figure 1:
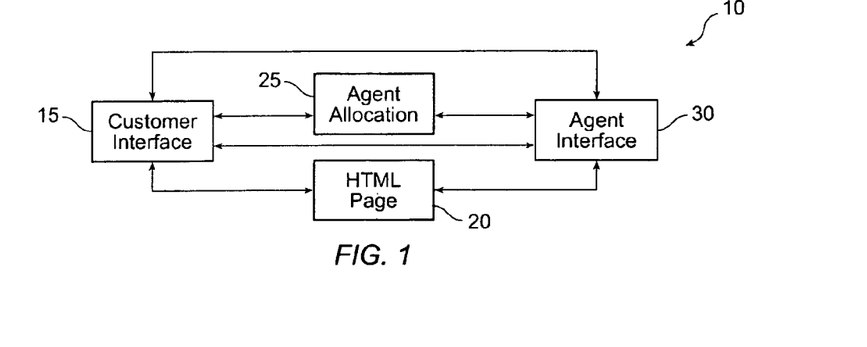
FIG. 1 is a simplified diagram showing a system 10 for inquiry distribution and processing according to an embodiment of the present invention.

FIG. 1 is a simplified diagram showing a system 10 for inquiry distribution and processing according to an embodiment of the present invention. The system 10 includes a customer interface system 15, an HTML page system 20, an agent allocation system 25, and an agent interface system 30.

The customer interface system 15 provides an interface between a customer and a contact center. The customer makes an inquiry, and the contact center processes and distributes the inquiry. The HTML page system 20 records interactions that occur at various stages of inquiry processing and distribution. The agent allocation system 25 selects an agent who has a desirable set of skills and is also available for engaging the customer. The agent interface system 30 provides an interface between the selected agent and the customer. These functions as described for the systems 15, 20, 25 and 30 are only exemplary. These systems may have other functions in various embodiments of the present invention.

Distribution and Processing of Telephone Inquiry

Figure 2:
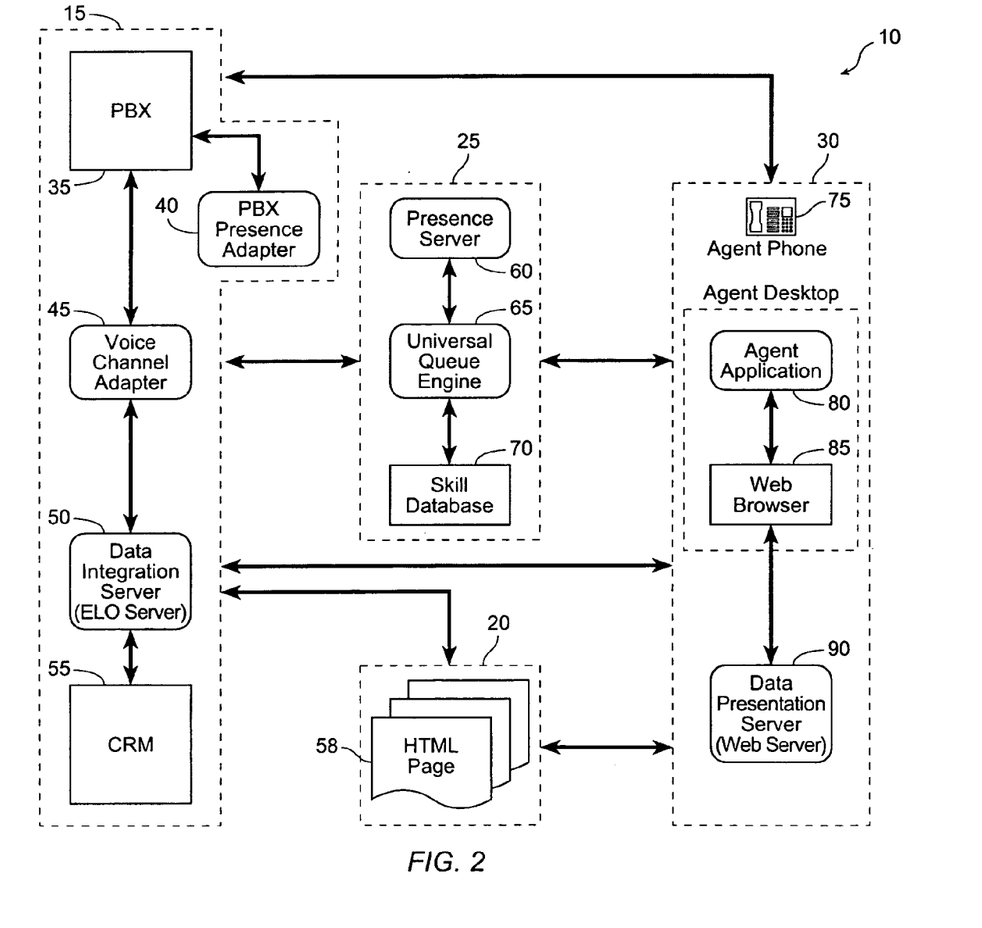
FIG. 2 is a simplified system diagram showing various components for inquiry distribution and processing according to an embodiment of the present invention.

FIG. 2 is a simplified system diagram showing various components for inquiry distribution and processing according to an embodiment of the present invention. The customer interface system 15 includes a telephone system such as a private branch exchange (PBX) 35, a PBX presence adapter 40, a voice channel adapter 45, a data integration server 50, and a database such as a customer relationship management (CRM) system 55. For example, the PBX presence adapter 40 may be a computer-telephony integration (CTI) system, the voice channel adapter 45 may be an interactive voice response (IVR) system, and the data integration server 50 is an ELO server.

The HTML page system 20 includes at least an HTML page 58. In another embodiment of the present invention, the HTML page system 20 may be replaced by any other type of database that can record interactions occurring during various stages of inquiry distribution and processing.

The agent allocation system 25 includes a presence server 60, a universal queue engine 65, and a skill database 70. For example, the presence server 60 keeps track of availability of agents, the universal queue engine 75 selects an available agent with a desirable set of skills, and the skill database 70 stores respective skills of various agents. The skills of each agent can be updated either periodically or manually by the agent or the contact center.

The agent interface system 30 includes an agent telephone 75, an agent application 80, an agent web browser 85, and a data presentation server 90. For example, the agent telephone 75 may be used by the selected agent to engage the customer, the agent web browser 85 can present content of the HTML page 58 to the selected agent, and the data presentation server is a web server that requests and receives information provided by the HTML page system 20. In another embodiment of the present invention, the web browser can be replaced by another computer program that can retrieve and present recorded interactions stored in the HTML page system 20 or in another database system.

Figure 3:
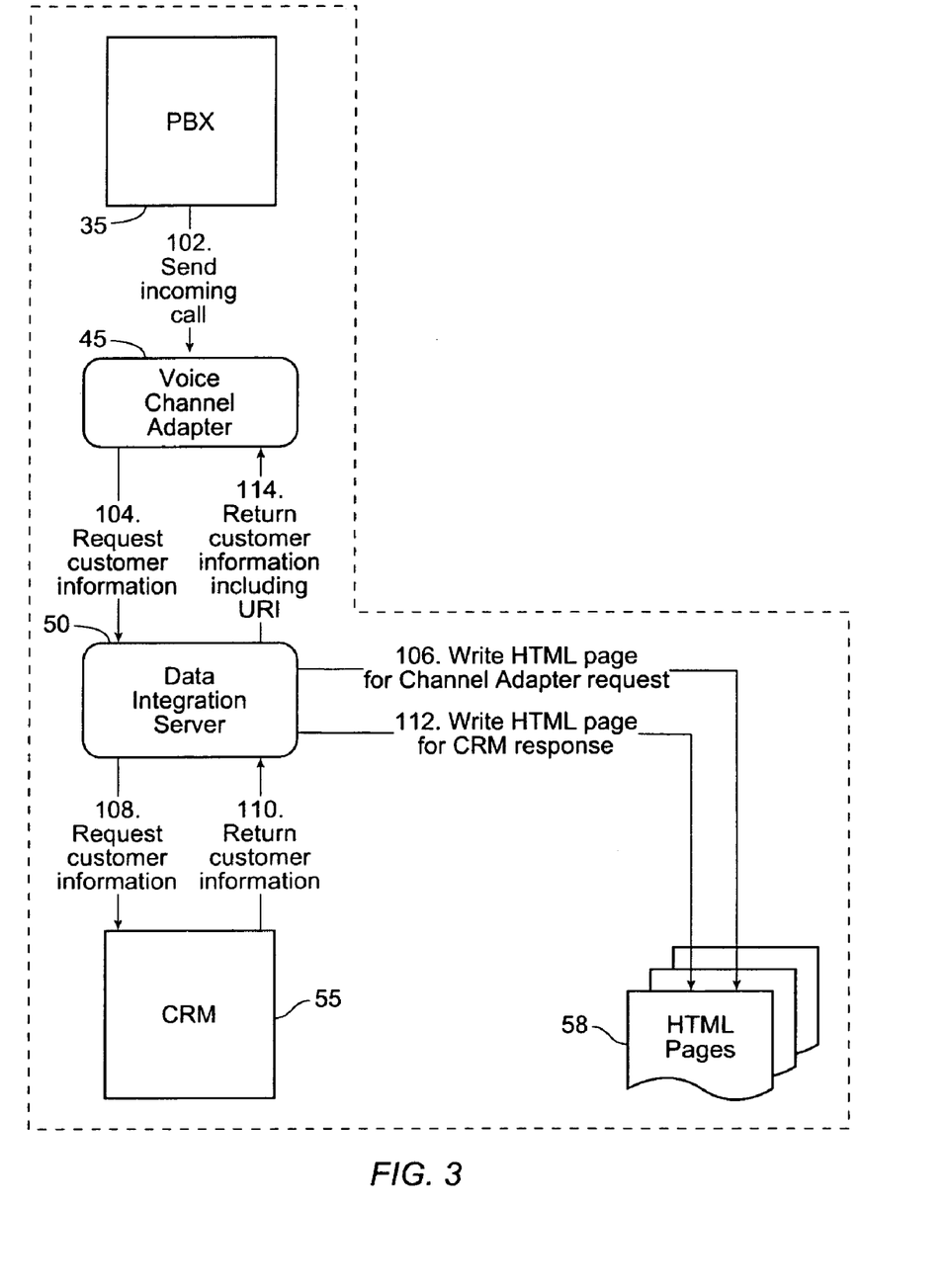
FIG. 3 is a simplified diagram showing initial distribution and processing for a customer inquiry according to an embodiment of the present invention.

FIG. 3 is a simplified diagram showing initial distribution and processing for a customer inquiry according to an embodiment of the present invention. The initial distribution and processing includes the following processes: a process 102 for sending a customer's incoming call to voice channel adapter, a process 104 by which the voice channel adapter requests customer information, a process 106 for writing the request made by the voice channel adapter to the HTML page, a process 108 by which the data integration server requests customer information, a process 110 by which the CRM requests customer information, a process 112 for writing the CRM response to the HTML page, and a process 114 for by which the data integration server provides customer information.

At the process 102 for sending customer's incoming call, the PBX 35 receives a customer's call from the contact center's external phone line and transfers the call to the voice channel adapter 45. At the process 104 for requesting customer information, the voice channel adapter 45 receives the customer's call and request identification from customer. The identification may take the form of a customer identification number, an account number, or others. Additionally, the voice channel adapter 45 may ask the customer to select the type of inquiry the customer intends to make. For example, the customer may press "1" to obtain product sales information and press "2" to obtain product delivery information. If the customer cannot provide any identification recognizable by the contact center, or the customer's inquiry does not fall under any predefined categories, an agent may answer the phone and obtain information from the customer. Upon receipt of customer's identification and inquiry information, the voice channel adapter 45 requests additional customer information from the data integration server 50.

At the process 106 for writing to the HTML page, the data integration server 50 writes its request for customer information to the HTML page 58. At the process 108 for requesting customer information, the data integration server 50 forwards the request received from the voice channel adapter 45 to the CRM 55. The CRM 55 contains information about the customer. For example, the customer information includes the basic information such as the customer's name, address, phone number, and email address. Additionally, the customer information may include the customer's past interactions with the contact center, such as the customer's past inquiries and their corresponding distributions and processing.

At the process 110 for providing customer information, the CRM 55 in response provides customer information to the data integration server 50. At the process 112 for writing to the HTML page, the data integration server 50 writes to the HTML page 58 the customer information provided by the CRM 55. At the process 114 for providing customer information, the data integration server 50 forwards to the voice channel adapter 45 the customer information provided by the CRM. Additionally, the data integration server provides the universal resource identifier (URI) of the HTML page 58. Alternatively, the URI can be replaced by any indicia that can guide an agent's application to find the HTML page or other types of databases as discussed above.

Figure 4:
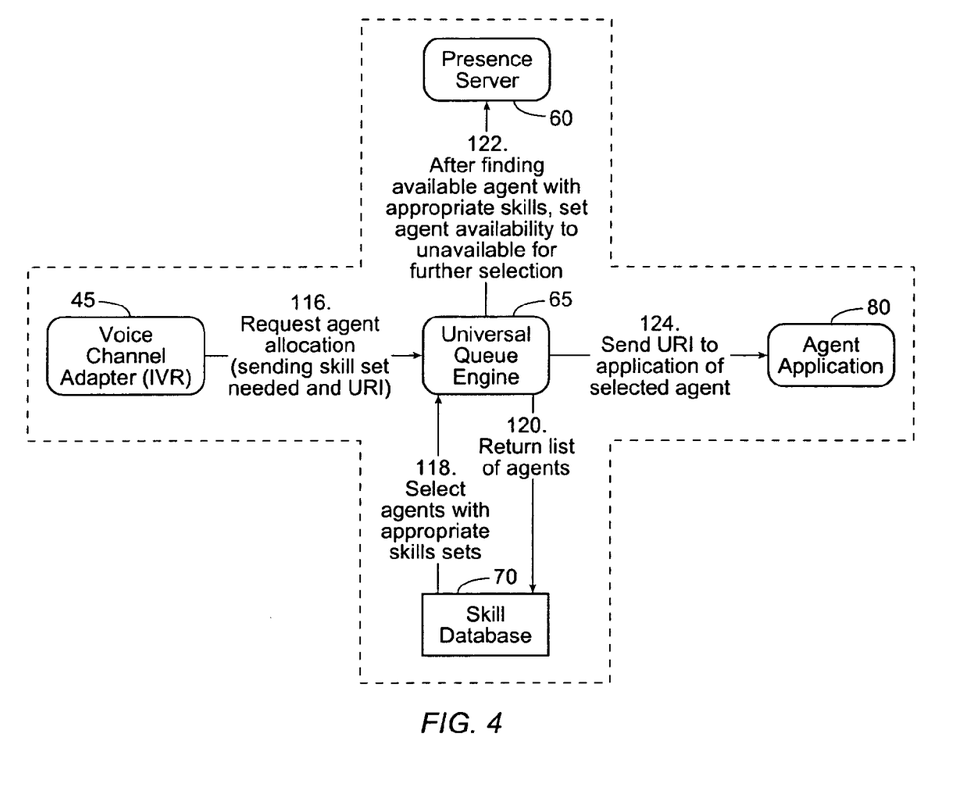
FIG. 4 is a simplified diagram showing a method for selecting an agent according to an embodiment of the present invention.

FIG. 4 is a simplified diagram showing a method for selecting an agent according to an embodiment of the present invention. The selection includes the following processes: a process 116 by which the voice channel adapter requests agent allocation, a process 118 for selecting a group of agents with a desirable skill set, a process 120 for providing a selected group of agents to universal queue engine, a process 122 for setting an agent's availability to "unavailable" for the first selected agent, and a process 124 for sending the URI of the HTML page to the agent application. The processes 118 and 120 may be skipped if the same set of desirable skills was used in a search for agents within a predetermined period of time.

At the process 116 for requesting agent allocation, the voice channel adapter 45 sends a desirable set of skills to the universal queue engine 65. The desirable set of skills is usually determined by the type of customer's inquiry and the customer information as retrieved from the CRM 55. Additionally, the voice channel adapter 45 may send the URI or similar indicia of the HTML page 58 or other types of databases to the universal queue engine 65. At the process 118 for selecting a group of agents, the universal queue engine 65 in response sends a search request to the skill database 70 for selecting a group of agents who possess the desirable set of skills.

At the process 120 for providing selected group of agents, the skill database 70 returns to the universal queue engine 65 a selected group of agents, each of whom possesses the desirable set of skills. The processes 118 and 120 may be repeated whenever the universal queue engine 65 receives a request for agent allocation from the voice channel adapter 45. Alternatively, the universal queue engine 65 stores the selected group of agents for a given set of skills and does not repeat the same search process if a skill set later received is the same as the one used in an earlier search. In yet another example, the universal queue engine conducts a new search if the later skill set is different from an earlier set or if the later skill set is the same as the earlier set but the time lapse between the receipts of the these two identical skill sets exceeds a predetermined time limit. During the given time limit, the skill database may have been updated.

At the process 122 for setting an agent's availability to "unavailable," the universal queue engine 65 identifies available agents from the selected group of agents and chooses one agent from the available agents. The one selected agent is here called the first selected agent. The selection may be conducted randomly or based on certain criterion or criteria. For example, the universal queue may choose an agent who has been available for the longest time since the agent's last engagement with a customer. Upon selection, the first selected agent is labeled as "unavailable" for subsequent selections by the universal queue agent 65 and the presence server 60 until the agent completes his engagement with the customer. As another example, the customer interface system 15 includes a bandwidth manager. The bandwidth manager is connected to the PBX 35 and the universal queue engine 65. The bandwidth manager detects whether the maximum bandwidth to a specific location is reached. If so, the bandwidth manager instructs the universal queue engine 65 not to assign any additional inquiries to any agent in this location.

The availability of an agent is affected by many factors. For example, an agent becomes available when he or she logs onto the presence server 60. As another example, an agent becomes unavailable when he or she logs off the presence server 60. The presence server 60 usually sends updated agent availabilities to the universal queue engine 65.

At the process 124 for sending the URI of the HTML page to application of the selected agent, the universal queue engine 65 sends the URI or similar indicia of the HTML page 58 or other types of databases to the agent application 80. The agent application is installed onto a computer system accessible to the first selected agent. For example, the computer system is the agent's personal computer using a Pentium microprocessor. Upon receipt of the URI or similar indicia, the agent application 80 alerts the agent about the selection made by the universal queue engine 65.

As discussed above and further emphasized here, FIG. 4 is merely an example, which should not unduly limit the scope of the present invention. One of ordinary skill in the art would recognize many variations, alternatives, and modifications. For example, the request for agent allocation is placed in a first-in-first-out queue. The request may contain a customer identification and a link to customer information in the CRM 55. Upon receiving the request, the universal queue engine 65 selects a desirable agent. The selection process takes into account the respective skills of various agents stored in the skill database 70. Additionally, the selection process also takes into account information related to the contact center where an agent is located. If the desirable agent is not available, the request is placed into another queue and further processed when the agent becomes available.

Figure 5:
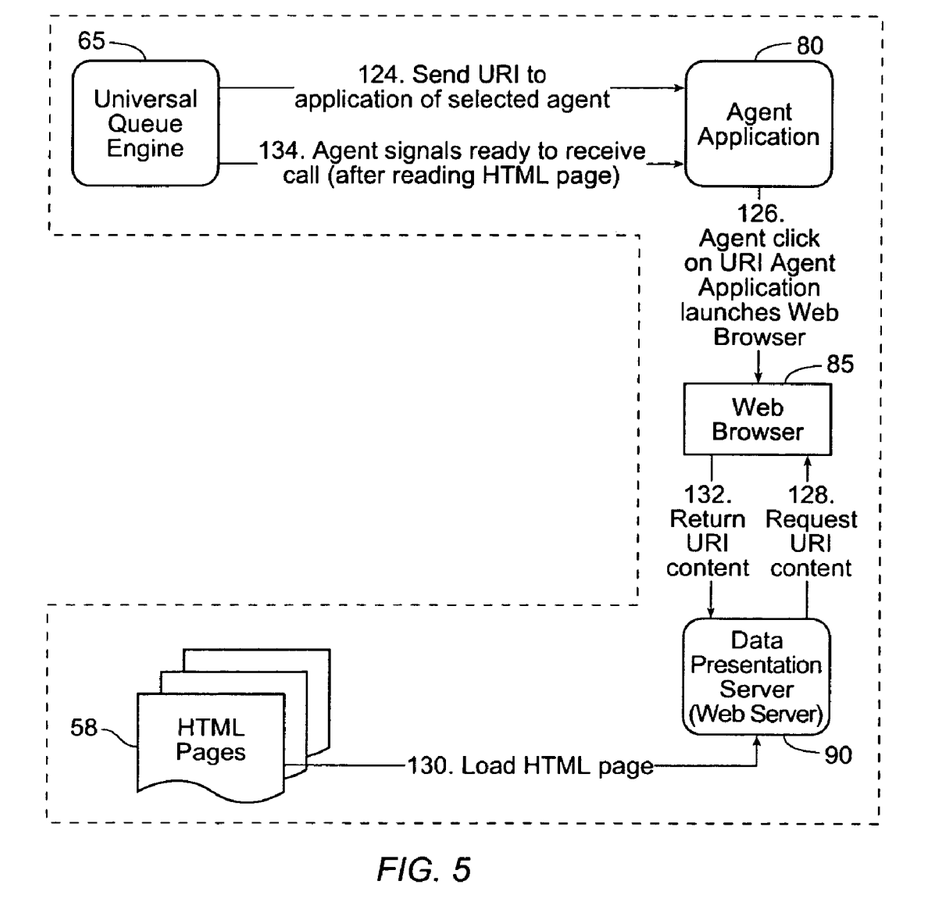
FIG. 5 is a simplified diagram of a method for agent review and acceptance of an inquiry according to an embodiment of the present invention.

FIG. 5 is a simplified diagram of a method for agent review and acceptance of an inquiry according to an embodiment of the present invention. The agent review and acceptance includes the following processes: a process 126 by which the first selected agent launches the web browser, a process 128 by which the web browser requests the URI content, a process 130 by which the data presentation server loads the HTML page, a process 132 by which the data presentation server provides the URI content, and a process 134 by which the first selected agent signals readiness to answer the customer's call.

At the process 126 for launching the web browser by the selected agent, the agent upon notice uses the URI or other indicia and launches the web browser. For example, the web browser is Microsoft Internet Explorer or Netscape Navigator. Alternatively, the web browser may be replaced by other computer programs capable of viewing the content of the HTML page or other types of databases. At the process 128 for requesting the URI content, the web browser 85 or similar computer program requests the content of the HTML page 58 or other types of databases from the data presentation server 90. At the process 130 for loading the HTML page, the data presentation server 90 loads the content of the HTML page 58 or other types of databases. At the process 132 for providing URI content, the data presentation server 90 provides to the web browser 85 or other computer programs the content of the HTML page 58 or other types of databases. At the process 134 for signaling readiness to engage customer, the first selected agent reviews the content of the HTML page or similar documents as they appear on the web browser 85 or similar computer programs, and decides whether he or she is ready to engage the customer. If the agent is ready, the agent sends such signal to the universal queue engine 65.

Figure 6:
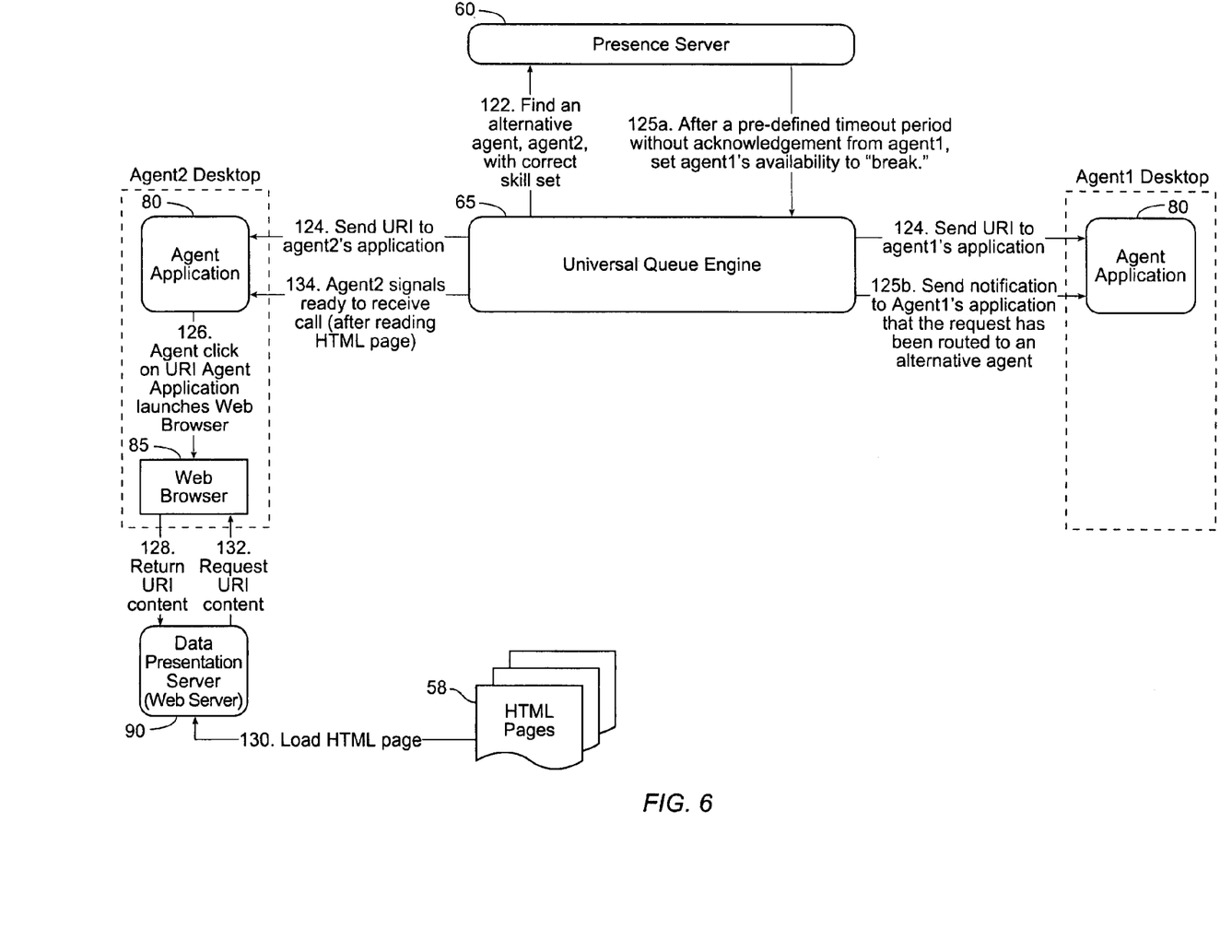
FIG. 6 is a simplified diagram of method for agent review and acceptance of inquiry according to another embodiment of the present invention.

FIG. 6 is a simplified diagram of method for agent review and acceptance of inquiry according to another embodiment of the present invention. The agent review and acceptance of inquiry includes a number of processes, some of which are the same or analogous to processes shown in FIGS. 4 and 5, and for which the same reference numbers are used. These processes include: the process 124 for sending the URI of the HTML page to the application of the first selected agent, a process 125a for setting the first selected agent's status to "break," a process 125b for sending rerouting notification to the first selected agent's application, the process 122 for setting the availability to "unavailable" for the second selected agent, the process 124 for sending URI of HTML page to application of second selected agent, the process 126 for launching web browser by the second selected agent, the process 128 for requesting URI content by web browser, the process 130 for loading the HTML page by the data presentation server, the process 132 for providing URI content by the data presentation server, and the process 134 for signaling readiness to answer the customer's call by second selected agent. As an example of the type of variation alluded to above, the process for changing the status of the first selected agent from "break" to "available" or "unavailable" can be inserted.

At the process 125a for setting the status of the first selected agent to "break," the universal queue engine 65 sets the status of the first selected agent to "break" if the universal queue engine 65 receives an indication of lack of readiness from the first selected agent or does not receive any indication from the first selected agent within a predetermined period of time. The lack of any indication from the first selected agent may result from the agent's absence without notifying the universal queue engine of his or her unavailability. In certain examples, the process 125a may be proceeded by some or all of the following processes: the process 126 for launching the web browser by the first selected agent, the process 128 for requesting URI content by the web browser, the process 130 for loading the HTML page by the data presentation server, and the process 132 for providing the URI content by the data presentation server to the web browser launched by the first selected agent. In other examples, the process 125a is not proceeded by any of these processes. At the process 125b for sending routing notification, the universal queue engine 65 notifies the first selected agent about rerouting the customer inquire to another agent. At the process 122 for setting availability to "unavailable" for the second selected agent, the universal queue engine 65 identifies another agent from the available agents who possesses the desired set of skills. The selection is substantially similar to that of the process 122 for first selected agent as discussed above. In some examples, the selection is proceeded by processes for selecting a group of agents with desirable skill set and for providing selected group of agents to universal queue engine, substantially similar to the processes 118 and 120 as discussed above. The processes 124 through 134 for second selected agent are substantially similar to the processes 124 through 134 for first selected agent as discussed above.

Figure 7:
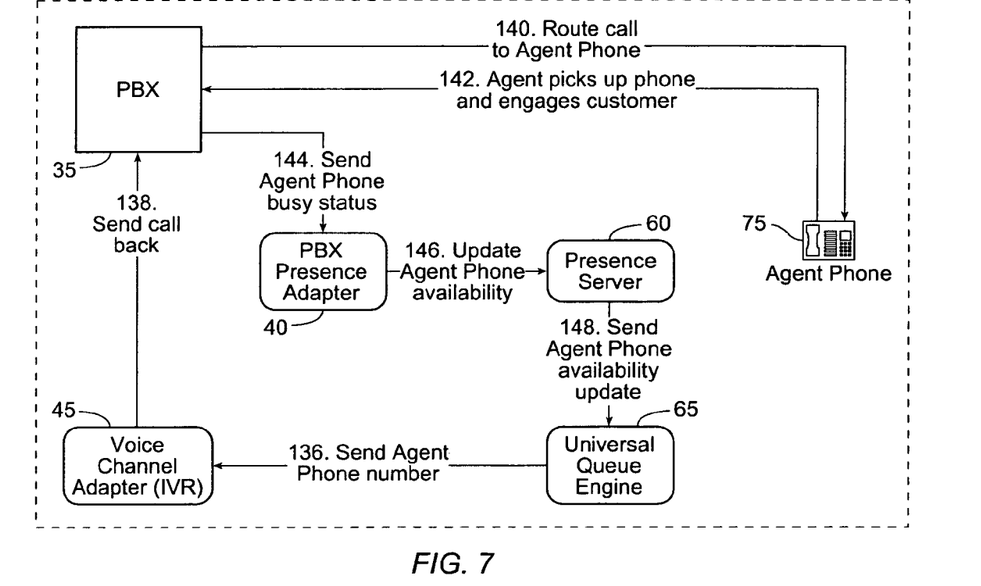
FIG. 7 is a simplified diagram showing a method for agent engagement according to an embodiment of the present invention.

FIG. 7 is a simplified diagram showing a method for agent engagement according to an embodiment of the present invention. The agent engagement includes the following processes: a process 136 for sending contact information of the selected agent to the voice channel adapter, a process 138 for sending the customer's call back from voice channel adapter, a process 140 for routing the customer's call to the selected agent, a process 142 for the selected agent answering the customer's call and engaging the customer, a process 144 for sending a "busy" status for the telephone of the selected agent, a process 146 for updating the availability of the telephone of the selected agent, and a process 148 for sending the updated agent availability to the universal queue engine. As an example of a variation, process 144 for sending a "busy" status for the selected agent's telephone and process 146 for updating the availability of selected agent's telephone in the presence server may be skipped.

At the process 136 for sending contact information of the selected agent to the voice channel adapter, the universal queue engine 65 receives the signal indicative of the agent's readiness and in response sends the contact information of the selected agent to the voice channel adapter 45. At the process 138 for sending the customer's call back, the voice channel adapter 45 returns the customer's call to the PBX 35. At the process 140 for routing the customer's call to the selected agent, the PBX 35 routes the call to the selected agent who has signaled his or her readiness.

At the process 142 for the selected agent answering the customer's call, the selected agent answers the forwarded customer's call and engages the customer. During engagement, the agent can also conference with another agent such as a supervisor. The other agent signals his or her readiness for conference after reviewing the content of the HTML page system 20. Alternatively, the other agent signals his or her readiness without reviewing the content of the HTML page system 20. At the beginning of the conference, the other agent notifies the presence server that he or she is no longer available, and at the end of the conference, the other agent should notify the presence server that he or she has just become available. The notification may be performed manually by the other agent or automatically by the agent application 80 of the other agent. During conference, the selected agent and the other agent communicate by phone, instant messaging system, or other means.

At the process 144 for sending a "busy" status for the telephone of the selected agent, the PBX sends the "busy" status for the selected agent's phone 75 to the PBX presence adapter. At the process 146 for updating the availability of the telephone of the first selected agent, the PBX presence adapter 40 updates the availability of the telephone 75 of the selected agent to the presence server 60. At the process 148 for sending the updated agent availability, the presence server 60 updates the availability of the agents including the selected agent, and forwards the updated availability of the agents to the universal queue engine 65. The update uses at least information associated with the "busy" status of the telephone 75 of the selected agent and the change of status of the selected agent as described in the process 122. For example, the update changes the status of the selected agent to "unavailable" only if his or her phone is "busy" and his or her status becomes "unavailable" in the process 122. Alternatively, the update changes the status of the selected agent to "unavailable" so long as his or her phone is "busy." In another embodiment of the present invention, the processes 144 and 146 may be skipped, and the update changes the status of the selected agent to "unavailable" so long as his or her status has been similarly changed in the process 122.

Figure 8:
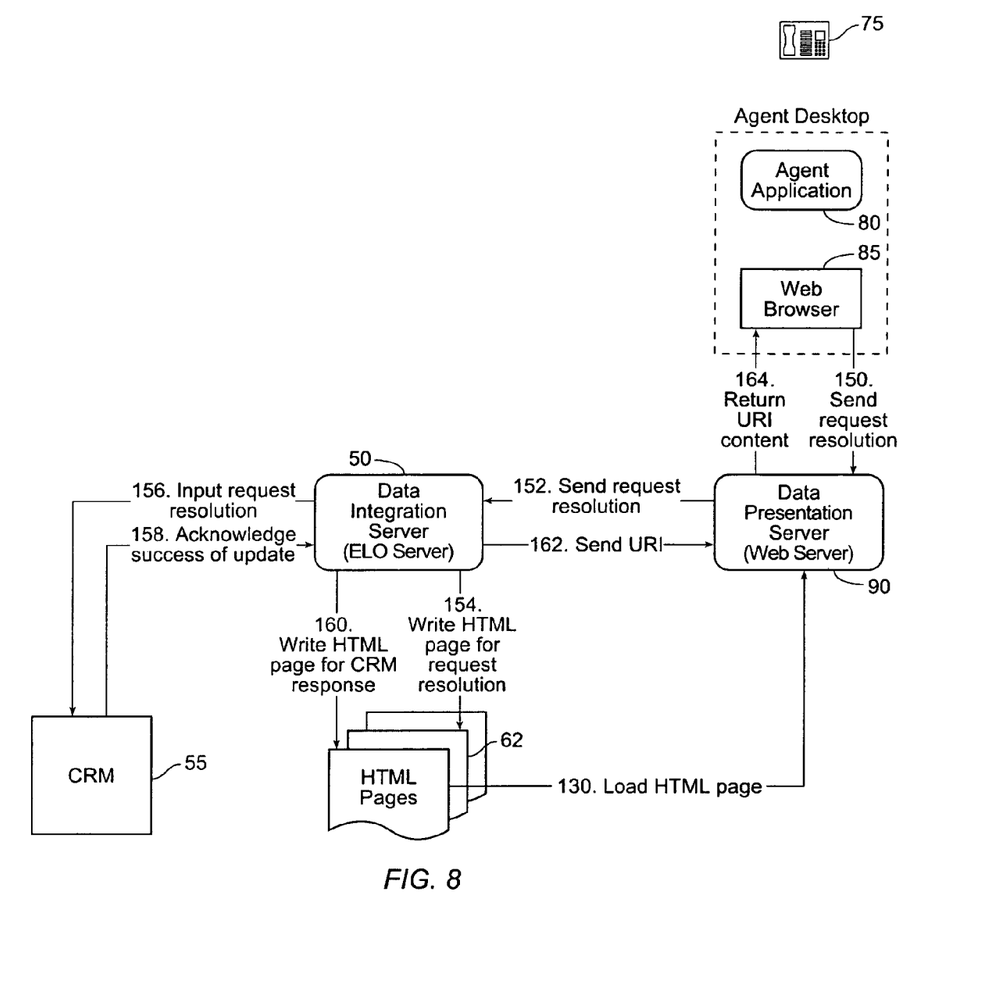
FIG. 8 is a simplified diagram of a method for customer-agent interactions according to an embodiment of the present invention.

FIG. 8 is a simplified diagram of a method for customer-agent interactions according to an embodiment of the present invention. The customer-agent interactions include the following processes: a process 150 for sending the inquiry resolution from the web browser, a process 152 for sending the inquiry resolution from the data presentation server, a process 154 for writing the inquiry resolution to the HTML page, a process 156 for updating the CRM, a process 158 for acknowledging the update from the CRM, a process 160 for writing an acknowledgement to the HTML page, a process 162 for sending the URI to the data presentation server, a process 130 for loading the HTML page, and a process 164 for providing the URI content.

At the process 150 for sending inquiry resolution, the selected agent records his or her interactions with the customer and sends the record from the web browser 85 to the data presentation server 90. At the process 152 for sending inquiry resolution, the data presentation server 90 sends the recorded resolution of the inquiry to the data integration server 50. At the process 154 for writing inquiry resolution to HTML page, the data integration server 50 writes the recorded resolution to an HTML page 62. The HTML page 62 may be the same as or different from the HTML page 58. Both the HTML pages 60 and 62 are part of the HTML page system 20. Similar to the HTML page 58, the HTML page 62 may be replaced by any database that can record the customer-agent interactions. At the process 156 for updating the CRM, the data integration server 50 sends the recorded resolution and updates the CRM 55. At the process 158 for acknowledging the update, the CRM 55 sends a signal acknowledging completion of the update. At the process 160 for writing the acknowledgement to the HTML page, the data integration server 50 writes the CRM's acknowledge to the HTML page 62. At the process 162 for sending the URI to the data presentation server, the data integration server 50 sends the URI or similar indicia of the HTML page 62 or other types of databases to the data presentation server 90. At the process 130 for loading the HTML page, the content of the HTML page 62 is loaded into the data presentation server 90 in a manner substantially similar to that discussed above. At the process 164 for providing URI content, the data presentation server 90 sends the content of the HTML page 62 to the web browser 85.

Figure 9:
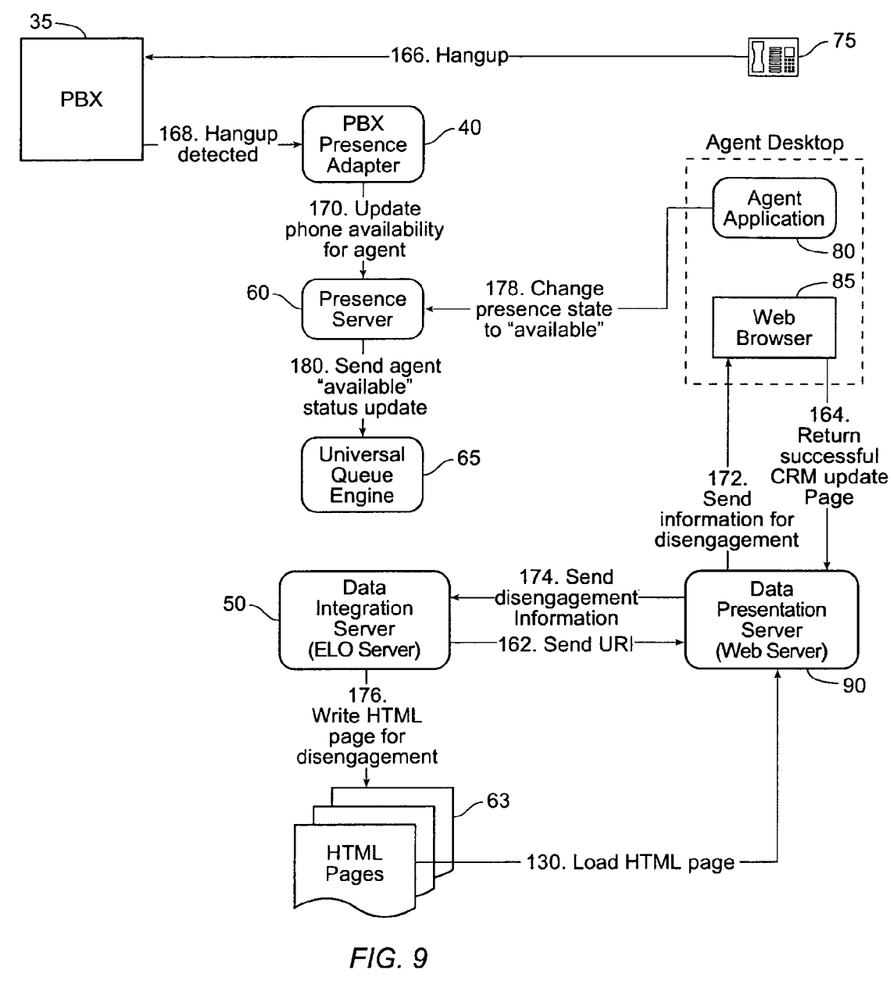
FIG. 9 is a simplified diagram of a method for agent disengagement according to an embodiment of the present invention.

FIG. 9 is a simplified diagram of a method for agent disengagement according to an embodiment of the present invention. The customer-agent interactions include the following processes: a process 166 for disconnecting contact between the customer and the agent, a process 168 for detecting the disconnection, a process 170 for updating the telephone availability of the selected agent, a process 172 for sending a disengagement signal from the web browser, a process 174 for sending a disengagement signal from the data presentation server, a process 176 for writing the disengagement information to the HTML page, a process 162 for sending the URI to the data presentation server, a process 130 for loading the HTML page, a process 164 for providing the URI content, and a process 178 for changing the availability of selected agent to "available." The process 168 for detecting disconnection and the process 170 for updating telephone availability may be skipped.

At the process 166 for disconnecting the contact, the telephone connection between the selected agent and the customer is terminated. At the process 168 for detecting the disconnection, the PBX presence adapter 40 detects the disconnection. At the process 170 for updating telephone availability, the PBX presence adapter updates the availability of telephone 75 to "available" in the presence server 60. At the process 172 for sending the disengagement signal, the web browser 85 sends a signal to the data presentation server 90 indicative of the disengagement between the selected agent and the customer. At the process 174 for sending the disengagement signal, the data presentation server forwards the disengagement signal to the data integration server 50. At the process 176 for writing the disengagement information to the HTML page, the data integration server 50 writes the disengagement information to an HTML page 63. The HTML page 63 may be the same as or different from the HTML page 58. Both the HTML pages 60 and 63 are part of the HTML page system 20. The HTML page 63 may be replaced by any database that can record the customer-agent interactions. The process 162 for sending the URI, the process 130 for loading the HTML page, and the process 164 for providing the URI content are substantially similar to discussed above, except the corresponding HTML page changes to the HTML page 63.

At the process 178 for changing the availability of selected agent, the presence server 60 updates the availability of the agents including the selected agent, and forwards the updated availability of the agents to the universal queue engine 65. The update uses at least information associated with "idle" status of the telephone 75 of the selected agent and the change of status of the selected agent as described in the process 178. For example, the update changes the status of the selected agent to "available" only if his or her phone is "idle" and his or her status becomes "available" in the process 178. Alternatively, the update changes the status of the selected agent to "available" so long as his or her phone is "idle." In another embodiment of the present invention, the processes 168 and 170 may be skipped, and the update changes the status of the selected agent to "available" so long as his or her status has been similarly changed in the process 178.

The disengagement between the selected agent and the customer may occur under various circumstances. For example, the selected agent may find through conversation with the customer that an agent with a different set of skills is needed. Hence the selected agent requests transfer of the inquiry. In response, the agent allocation system 25 selects an agent who possesses a different skill set and is available for engagement. After the agent reviews the content stored in the HTML page system 20 and signals his or her readiness to accept the inquiry, the engagement between the agent and the customer is established. Consequently, the availabilities of the new agent and the previous agent are updated accordingly. As another example, the disengagement occurs when the customer terminates the conversation by hanging up his or her telephone. The termination would be recorded in the CRM 55 and in the HTML page system 20. Additionally, the termination may occur even before the selected agent starts engaging with the customer. In this case, the agent would be informed of the termination.

As discussed above and further emphasized here, FIGS. 1 through 9 are merely examples, which should not unduly limit the scope of the present invention. One of ordinary skill in the art would recognize many variations, alternatives, and modifications. For example, the HTML pages 58, 62, and 63 are the same HTML page. In another example, the HTML pages contain certain links to information stored in the CRM 55 or other data source. When the HTML pages are loaded onto the web browser 85, the HTML pages retrieve the information from the CRM 55 or other data source. In yet another example, the CRM 55 stores information related to customers and the customers' interactions with contact center including various agents.

Distribution and Processing of Various Types of Inquiries

The methods of inquiry distribution and processing as discussed above and as shown in FIGS. 1 through 9 are applicable to customer inquiry not only through telephone system but also over the Internet. The customer inquiry over the Internet may be initiated by the customer or by the contact center.

In another embodiment of the present invention, the PBX 35 in FIGS. 1 through 9 is replaced by an instant messaging ("IM") corporate server and an IM bridge, the PBX presence adapter 40 is replaced by an IM presence adapter, the voice channel adapter 45 is replaced by an IM channel adapter, and the agent telephone 75 is replaced by an agent IM system. The method of inquiry distribution and processing as shown in FIGS. 1 through 9 applies substantially to this embodiment, except the agent and the customer communicate by instant messaging instead of telephone.

In yet another embodiment of the present invention, the customer inquiry over the Internet is initiated by the contact center. The PBX 35 in FIGS. 1 through 9 is replaced by an IContact server and a web server, the PBX presence adapter 40 is replaced by an IContact presence adapter, the voice channel adapter 45 is replaced by an IContact channel adapter, and the agent telephone 75 is replaced by an agent IContact system. See PCT International Application No. PCT/US00/00067 and International Publication No. WO 00/41118, which is incorporated by reference herein for all purposes. See also U.S. application Ser. No. 09/167,054 and Publication No. US 2002/0083167, which is incorporated by reference herein for all purposes. In this embodiment of the present invention, the IContact server initiates a contact with a customer by monitoring the customer's web-surfing activities. For example, the customer accesses and navigates a website monitored by the IContact server and in response the IContact server asks whether the customer needs any assistance. The method of inquiry distribution and processing as shown in FIGS. 1 through 9 applies substantially to this embodiment, except the agent and the customer communicate by the IContact system instead of telephone.

Figure 10:
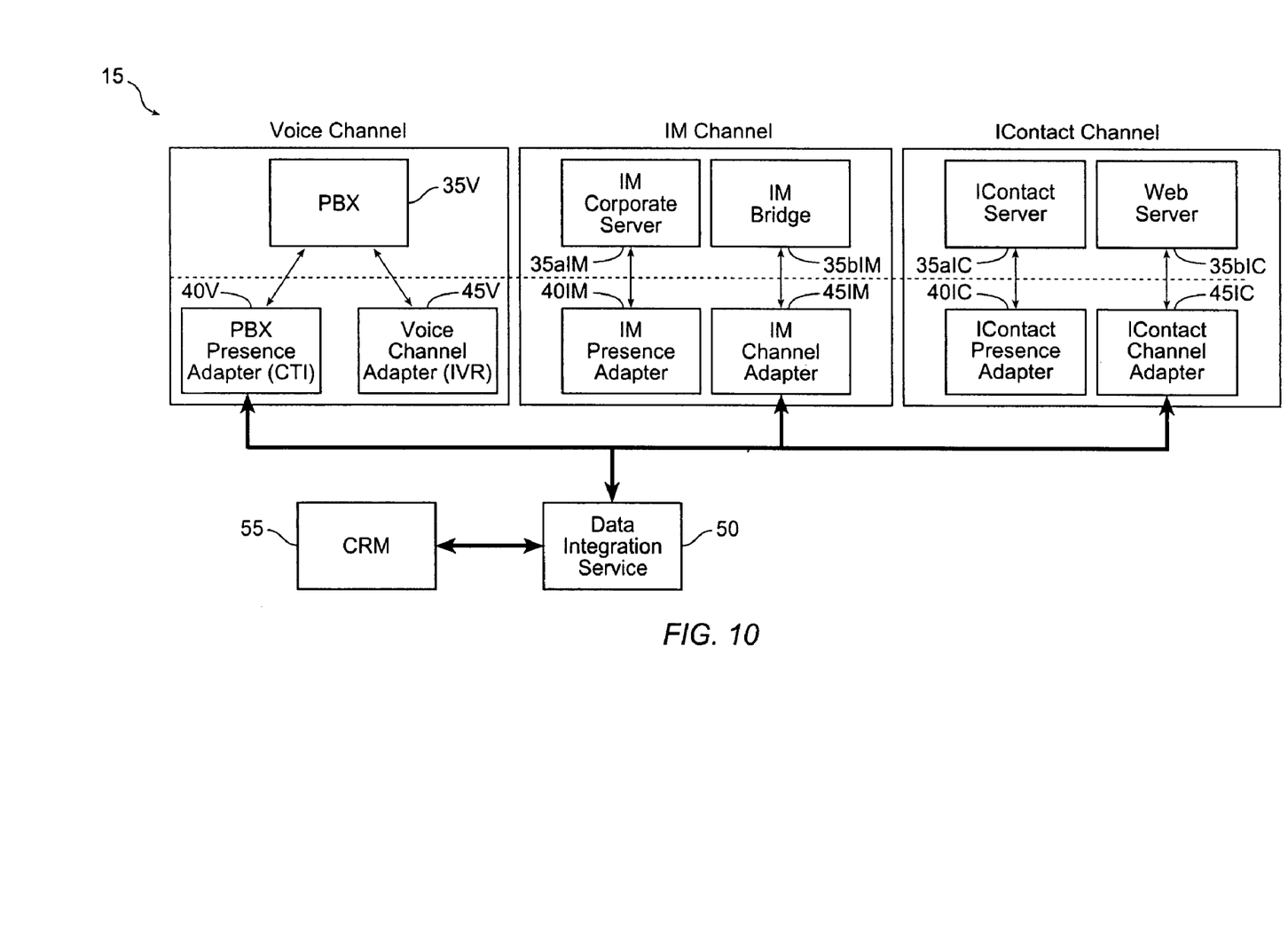
FIG. 10 is a simplified diagram of customer interface system 15 with various types of communications.

FIG. 10 is a simplified diagram of customer interface system 15 with various types of communications. The customer interface system 15 includes a communication interface, the data integration server 50, and the CRM 55. The communication interface includes three components: a voice channel, an IM channel, and an IContact channel. The voice channel includes the PBX 35V, the PBX presence adapter 40V, and voice channel adapter 45V. The IM channel includes the IM corporate server 35aIM, the IM bridge 35bIM, the IM presence adapter 40IM, and IM channel adapter 45IM. The IContact channel includes the IContact server 35aIC, the web server 35bIC, the IContact presence adapter 40IC, and IContact channel adapter 45IC. One or two of the voice channel, the IM channel, and the IContact channel may be removed.

As shown in FIG. 10, the customer may communicate with the contact center by any two or all of the following means: telephone, instant messaging, and IContact. Correspondingly, the selected agent can respond to the customer with the agent telephone, the agent IM system, and the agent IContact system respectively. Additionally, during engagement with the customer, the selected agent can interact with other agents with a communication channel the same as or different from the communication channel used for customer engagement.

Attached Appendices

Attached hereto are Appendices A, B, and C filed as part of this application. Appendices A and B are titled "Product Requirements Document" and "Agent desk top—Functional Specifications" respectively. Appendices A and B include additional details and features of certain embodiments of the invention. Additionally, Appendix C provides definitions that may be used for some embodiments of the present invention. The entire disclosure of Appendices A, B, and C is incorporated by reference for all purposes. It should be recognized that Appendices A and B are, by their nature, specific and use terms such as "shall," "will," and the like. From the point of view of the invention, such language should be taken in the context of a specific embodiment and not as imposing such requirements on other embodiments and aspects of the invention.

CONCLUSION

The present invention has many advantages over conventional technologies. For example, certain embodiments of the present invention, the traditional "push" of the customer inquiry and the customer information is replaced with a "pull" paradigm that assures that an agent receives both the inquiry and the information and enables transfers and conferencing. In some embodiments of the present invention, knowledge about agents is kept centrally. For example, an agent list knowledgeable of each agent has two components: a static component and a dynamic component. The static component includes identification of an agent, skills of an agent, location of an agent and contact information of an agent. The contact information may include an agent's phone number or/and an agent's IP address. The dynamic component contains "presence" information, such as time when an agent logs onto the network, time lapse since an agent's last engagement with customer.

In certain embodiments, a customer inquiry is not forwarded to the selected agent until the agent reviews the customer information and ensures that the customer information provided in the initial interaction does not need to be reentered. Some embodiments of the present invention includes self balancing of the queue. The self balancing is usually performed by agents by update their availability retained in the dynamic list retained in the universal queue engine. Geographical distribution of agents is not an impediment to agent assignment. The universal queue engine maintain connection information that is not distance dependant. Time of day of customer inquiry can be managed automatically as agents in different time zones manage their own presence automatically by logging in and out.

While the above is a complete description of specific embodiments of the invention, the above description should not be taken as limiting the scope of the invention as defined by the claims.

What is claimed is:

1. A method for processing a user inquiry, the method comprising:
   receiving a user inquiry;
   sending a first request for user information to a first database;
   providing the user information from the first database;
   selecting a first agent, the first agent having a desirable set of skills and being available;
   sending the user information to the selected first agent with a first web browser; and sending the user inquiry to the selected first agent in response to a first signal indicative of a first consent from the selected first agent within a predetermined period of time.

2. The method of claim 1 wherein the selecting a first agent comprises:
detecting an amount of information traffic to an agent location; and
if the detected amount of information traffic reaches or exceeds a predetermined traffic level, avoiding choosing any agent from the agent location as the first agent.

3. The method of claim 1, and further comprising:
processing the user information with the first web browser by the selected first agent.

4. The method of claim 1, and further comprising:
in response to a lack of the first signal indicative of the first consent within the predetermined period of time, selecting a second agent, the second agent having the desirable set of skills and being available; and
sending the user information to the selected second agent with a second web browser.

5. The method of claim 4, and further comprising:
setting a status of the selected first agent to "unavailable" in response to the first signal indicative of the first consent from the selected first agent within the predetermined period of time.

6. The method of claim 5 wherein the sending the user information to the selected first agent with a first web browser comprises retrieving the user information from the first database by a HTML page.

7. The method of claim 4 wherein the user inquiry is at least one selected from a group consisting of a user phone inquiry and a user message inquiry.

8. The method of claim 7 wherein the user message is initiated by a user.

9. The method of claim 7 wherein the user message is initiated by a contact center.

10. The method of claim 4, and further comprising:
in response to the lack of the first signal indicative of the first consent from the selected first agent within the predetermined period of time,
setting the status of the selected first agent to "break;" and
sending a first notification to the selected first agent, the first notification indicative of selecting the second agent.

11. The method of claim 4, and further comprising:
in response to the first signal indicative of the first consent from the selected first agent within the predetermined period of time,
providing a first communication channel between a user and the selected first agent;
disconnecting the first communication channel between the user and the selected first agent; and
setting the status of the selected first agent to "available."

12. The method of claim 11 wherein the providing a first communication channel further comprises:
setting a status of a third agent to "unavailable;"
conducting a conference between at least two of the user, the selected first agent and the third agent; and
setting the status of the third agent to "available."

13. The method of claim 12 wherein the conducting a conference comprises:
providing a second communication channel between the selected first agent and the third agent; and
wherein the second communication channel different from the first communication channel.

14. The method of claim 13 wherein the first communication channel is a telephone channel, and the second communication channel is a message channel.

15. The method of claim 1 wherein the selecting a first agent comprises:
accessing a second database, the second database storing a plurality of sets of skills for a plurality of agents respectively.

16. A method for processing a user inquiry, the method comprising:
receiving user information from a first database, the user information associated with a request;
processing the user information with a web browser;
sending a first signal indicative of a first consent within a predetermined period of time in response to the user information; and
receiving a user inquiry in response to the first signal indicative of the first consent.

17. The method of claim 16 wherein the receiving user information from a first database comprises retrieving the user information from the first database by a HTML page.

18. The method of claim 16 wherein the user inquiry is at least one selected from a group consisting of a user phone inquiry and a user message inquiry.

19. The method of claim 18 wherein the user message is initiated by a user.

20. The method of claim 18 wherein the user message is initiated by a contact center.

21. The method of claim 16, and further comprising:
communicating with a user over a first communication channel; and
sending information associated with the communicating with the user to the first database.

22. The method of claim 21, and further comprising:
communicating with another agent over a second communication channel.

23. The method of claim 22 wherein the second communication channel is different from the first communication channel.

24. The method of claim 23 wherein the first communication channel is a telephone channel, and the second communication channel is a message channel.

25. A system for processing a user inquiry, the system comprising:
a user interface system to receive a user inquiry and to request user information associated with the user inquiry;
a first database to store and provide information associated with at least the user inquiry;
a second database to store information relating to a plurality of agents, the information relating to the plurality of agents including a plurality of sets of skills corresponding to the plurality of agents respectively;
an agent allocation system to identify a first agent having a desirable set of skills and being available based on at least the information relating to the plurality of agents; and
an agent interface system for the first agent configured to receive the user information with a web browser; and send a first signal indicative of a first consent from the first agent in response to at least the user information.

26. The system of claim 25 wherein the user interface system and the agent interface system provide a communication channel between a user and the first agent in response to the first signal indicative of the first consent from the first agent.

27. The system of claim 26 wherein the agent interface system sends inquiry information relating to a communication between the user and the first agent over the communication channel.

28. The system of claim 27 wherein the first database provides the inquiry information to the agent interface system.

29. The system of claim 25 wherein the user inquiry is at least one selected from a group consisting of a user phone inquiry and a user message inquiry.

30. The system of claim 29 wherein the user message is initiated by a user.

31. The system of claim 29 wherein the user message is initiated by the user interface system.

* * * * *